United States Patent
Fujita

(10) Patent No.: US 12,508,632 B2
(45) Date of Patent: Dec. 30, 2025

(54) CLEANING TOOL AND CLEANING METHOD

(71) Applicant: FUJIKURA LTD., Tokyo (JP)

(72) Inventor: Shunsuke Fujita, Chiba (JP)

(73) Assignee: Fujikura Ltd., Tokyo (JP)

( * ) Notice: Subject to any disclaimer, the term of this patent is extended or adjusted under 35 U.S.C. 154(b) by 309 days.

(21) Appl. No.: 18/014,641

(22) PCT Filed: Mar. 22, 2021

(86) PCT No.: PCT/JP2021/011697
§ 371 (c)(1),
(2) Date: Jan. 5, 2023

(87) PCT Pub. No.: WO2022/074861
PCT Pub. Date: Apr. 14, 2022

(65) Prior Publication Data
US 2023/0273374 A1    Aug. 31, 2023

(30) Foreign Application Priority Data

Oct. 7, 2020   (JP) .................................. 2020-170060

(51) Int. Cl.
*B08B 1/30* (2024.01)
*B08B 1/14* (2024.01)
*G02B 6/38* (2006.01)

(52) U.S. Cl.
CPC ............... *B08B 1/30* (2024.01); *B08B 1/143* (2024.01); *G02B 6/3866* (2013.01)

(58) Field of Classification Search
CPC ....... B08B 1/30; B08B 2240/02; B08B 1/143; B08B 1/00; B08B 1/32; A46B 7/06; G02B 6/3866

USPC .............................................. 15/210.1, 143.1
See application file for complete search history.

(56) References Cited

U.S. PATENT DOCUMENTS

| | | | |
|---|---|---|---|
| 8,266,755 B2 * | 9/2012 | Nakane | G02B 6/3807 15/210.1 |
| 2012/0066849 A1 * | 3/2012 | Fujiwara | G02B 6/3866 15/97.1 |
| 2013/0305469 A1 * | 11/2013 | Rodriguez Sanjuan | A61B 1/122 15/104.05 |

(Continued)

FOREIGN PATENT DOCUMENTS

| | | |
|---|---|---|
| CN | 109906394 A | 6/2019 |
| CN | 110799873 A | 2/2020 |
| JP | 2005181971 A | 7/2005 |

(Continued)

*Primary Examiner* — Katina N. Henson
(74) *Attorney, Agent, or Firm* — Osha Bergman Watanabe & Burton LLP

(57) ABSTRACT

A cleaning tool includes: a tool main body; an insertion part that moves in a predetermined direction relative to the tool main body, and is configured to hold a head unit movable backward and configured to press a cleaning body against a cleaning target; a retrieve mechanism that retrieves the cleaning body using a relative movement in the predetermined direction between the tool main body and the insertion part; and a rotation mechanism that rotates the head unit after the retrieve mechanism retrieves the cleaning body using the relative movement in the predetermined direction between the tool main body and the insertion part.

5 Claims, 12 Drawing Sheets

(56) References Cited

U.S. PATENT DOCUMENTS

2015/0107036 A1    4/2015  Lee

FOREIGN PATENT DOCUMENTS

| | | |
|---|---|---|
| JP | 2010-266675 A | 11/2010 |
| JP | 3167915 U | 5/2011 |
| JP | 2014206733 A | 10/2014 |
| JP | 2017049397 A | 3/2017 |
| WO | 2020170539 A1 | 8/2020 |

* cited by examiner (INITIAL STATE)

(IMMEDIATELY BEFORE HOUSING BODY MOVES BACKWARD)

(WHEN HOUSING BODY MOVES BACKWARD)

(WHEN CLEANING PLUG)

(WHEN CLEANING RECEPTACLE)

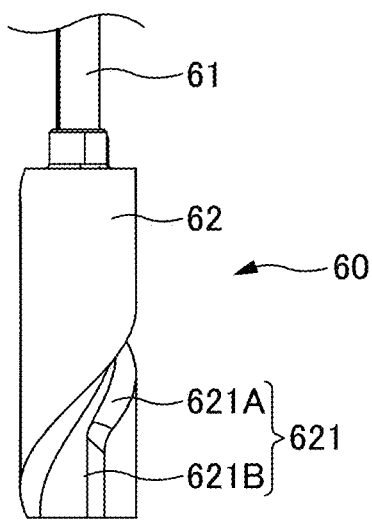 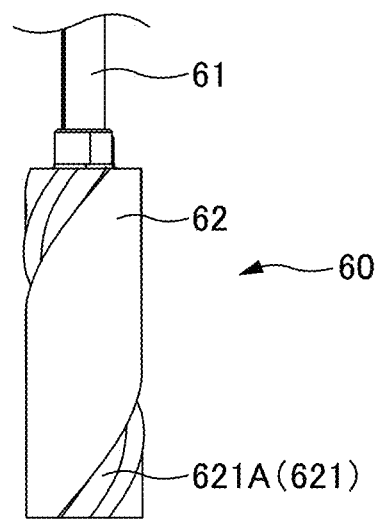
FIG. 9A
FIG. 9B
(COMPARATIVE EXAMPLE)

(INITIAL STATE)

(AFTER PUSH-BACK, IMMEDIATELY BEFORE MOVEMENT)

(IMMEDIATELY AFTER MOVEMENT)

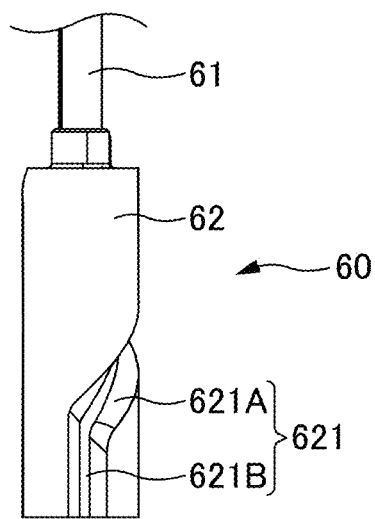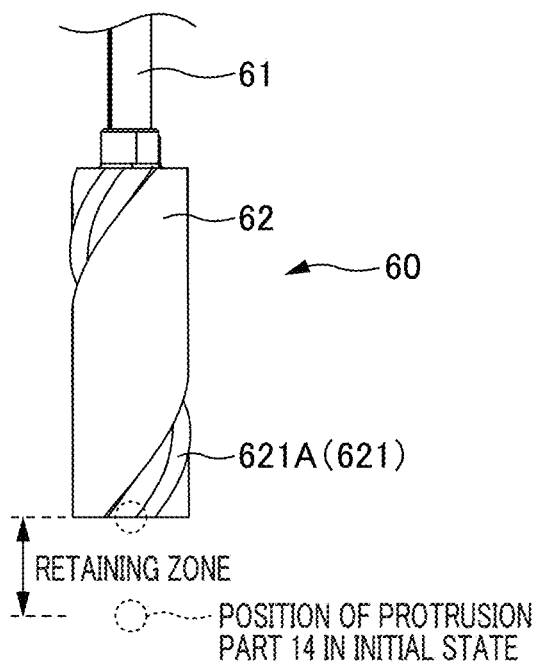
FIG. 11A
(FIRST MODIFICATION)
FIG. 11B
(SECOND MODIFICATION)

(COMPARATIVE EXAMPLE: INITIAL STATE)

(COMPARATIVE EXAMPLE: AFTER PUSH-BACK, IMMEDIATELY BEFORE MOVEMENT)

(COMPARATIVE EXAMPLE: IMMEDIATELY AFTER MOVEMENT)

CLEANING TOOL AND CLEANING METHOD

TECHNICAL FIELD

The present disclosure relates to a cleaning tool and a cleaning method.

BACKGROUND

A cleaning tool for cleaning a connecting end face of an optical connector in order to decrease coupling loss between optical connectors is known. Such a cleaning tool may include a mechanism for pressing a head in such a manner that the head is movable backward, a mechanism for rotating the head (a cleaning shaft) during cleaning, and the like (see PTL 1).

PATENT LITERATURE

[PTL 1] Japanese Patent Application Publication No. 2014-206733

When a head moves backward by being pressed against a connecting end face of an optical connector, a cleaning body may loosen inside the cleaning tool. Then, in a case where the head is rotated with the cleaning body being loose, the loose cleaning body may get entangled inside the cleaning tool.

SUMMARY

One or more embodiments of the present invention prevent a cleaning body from getting entangled inside a cleaning tool.

One or more embodiments of the present invention provide a cleaning tool comprising: a tool main body; an insertion part configured to move in a predetermined direction relative to the tool main body and hold a head unit configured to press a cleaning body against a cleaning target in such a manner that the head unit is movable backward; a retrieve mechanism configured to retrieve the cleaning body using a relative movement in the predetermined direction between the tool main body and the insertion part; and a rotation mechanism configured to rotate the head unit after the retrieve mechanism retrieves the cleaning body using the relative movement in the predetermined direction between the tool main body and the insertion part.

One or more embodiments of the present invention provide a cleaning method comprising: pressing a cleaning body against a cleaning target with a head unit; moving a tool main body and an insertion part having the head unit relative to each other in a predetermined direction with the cleaning body being pressed against the cleaning target with the head unit; retrieving the cleaning body using the relative movement between the tool main body and the insertion part in the predetermined direction; and rotating the head unit after retrieving the cleaning body using the relative movement between the tool main body and the insertion part in the predetermined direction.

Other features of the present invention will become apparent from the following description and the drawings.

The present invention can prevent a cleaning body from getting entangled inside a cleaning tool.

BRIEF DESCRIPTION OF THE DRAWINGS

FIG. 9A is a diagram illustrating a cam groove part 621 of one or more embodiments.

FIG. 9B is a diagram illustrating a cam groove part 621 of a comparative example.

FIG. 11A is a diagram illustrating a rotary cylindrical part 62 of a first modification.

FIG. 11B is a diagram illustrating the rotary cylindrical part 62 of a second modification.

DETAILED DESCRIPTION

One or more embodiments as examples of the invention of the present application are described using the following description and the drawings.

<Configuration>

Figure 1A:
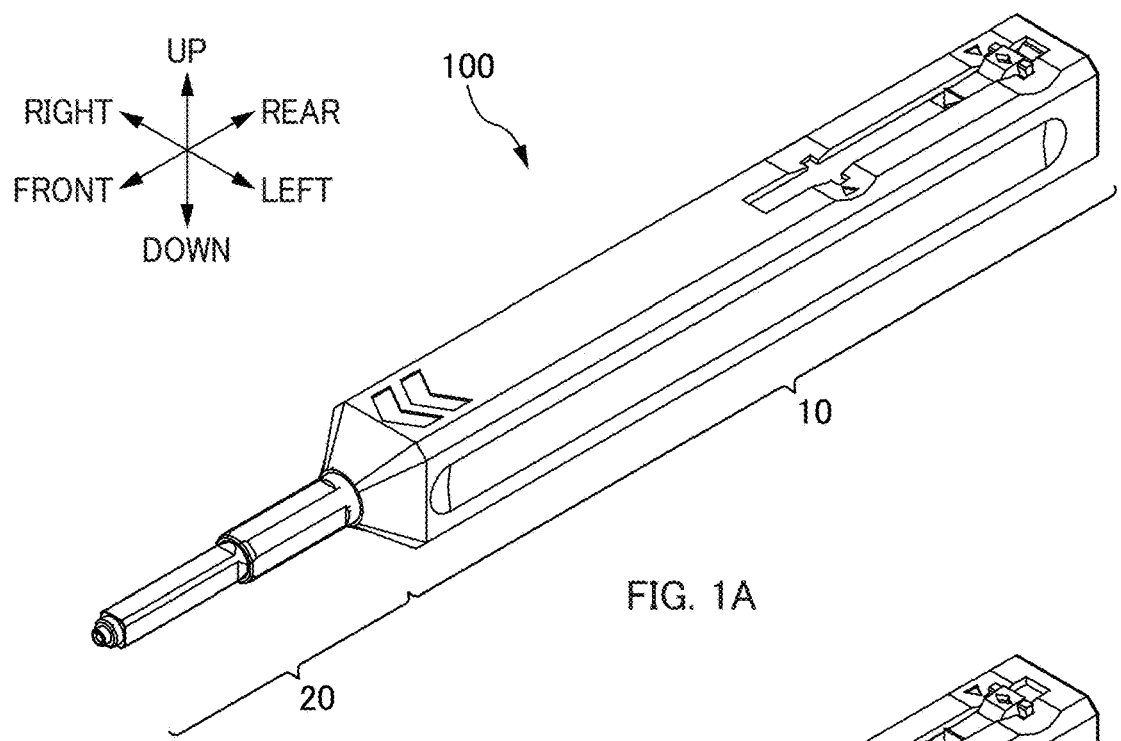
FIG. 1A is a perspective view of a cleaning tool 100 of one or more embodiments.
Figure 1B:
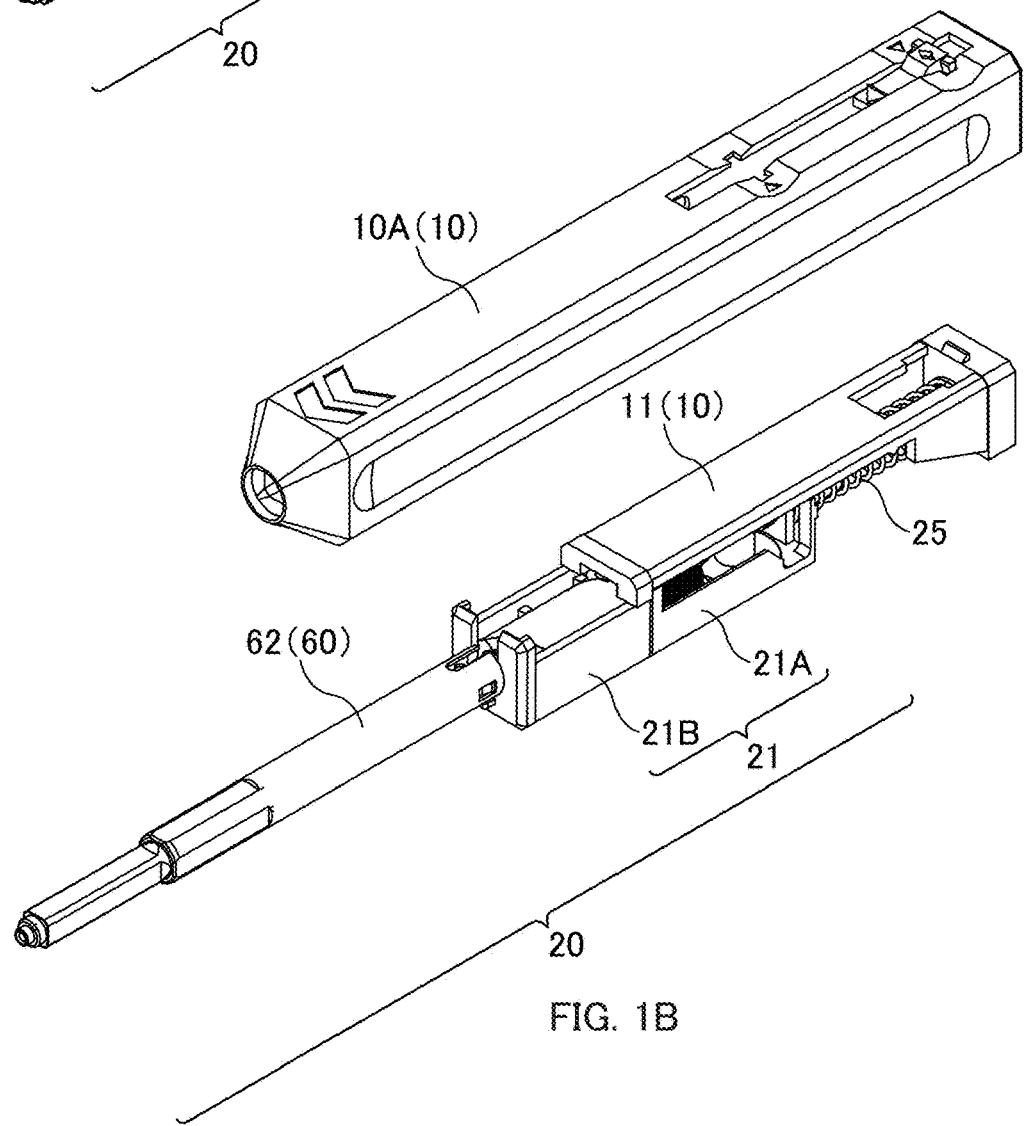
FIG. 1B is a perspective view of the cleaning tool 100 with a case 10A being removed.
Figure 2:
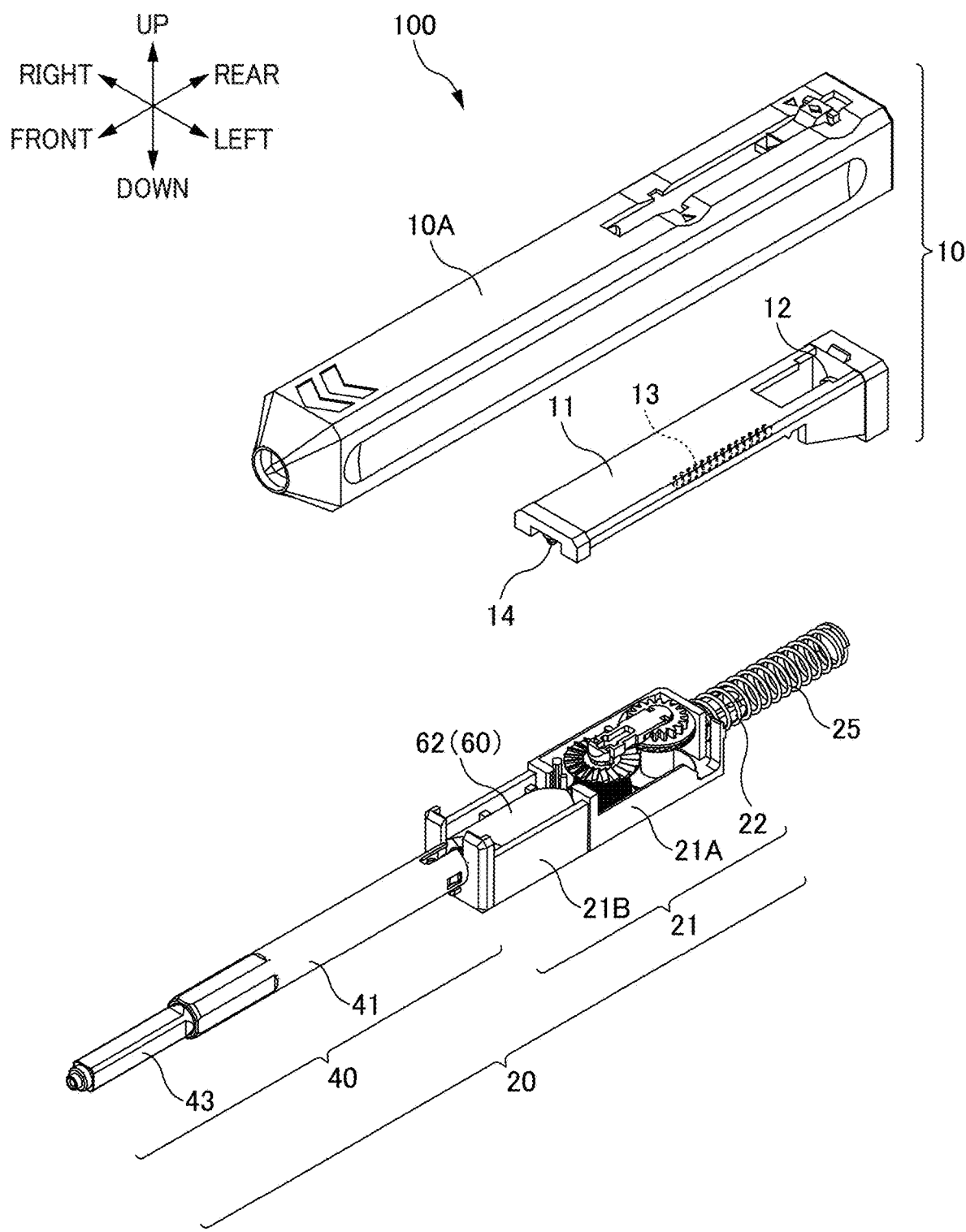
FIG. 2 is an exploded view of the cleaning tool 100.
Figure 3:
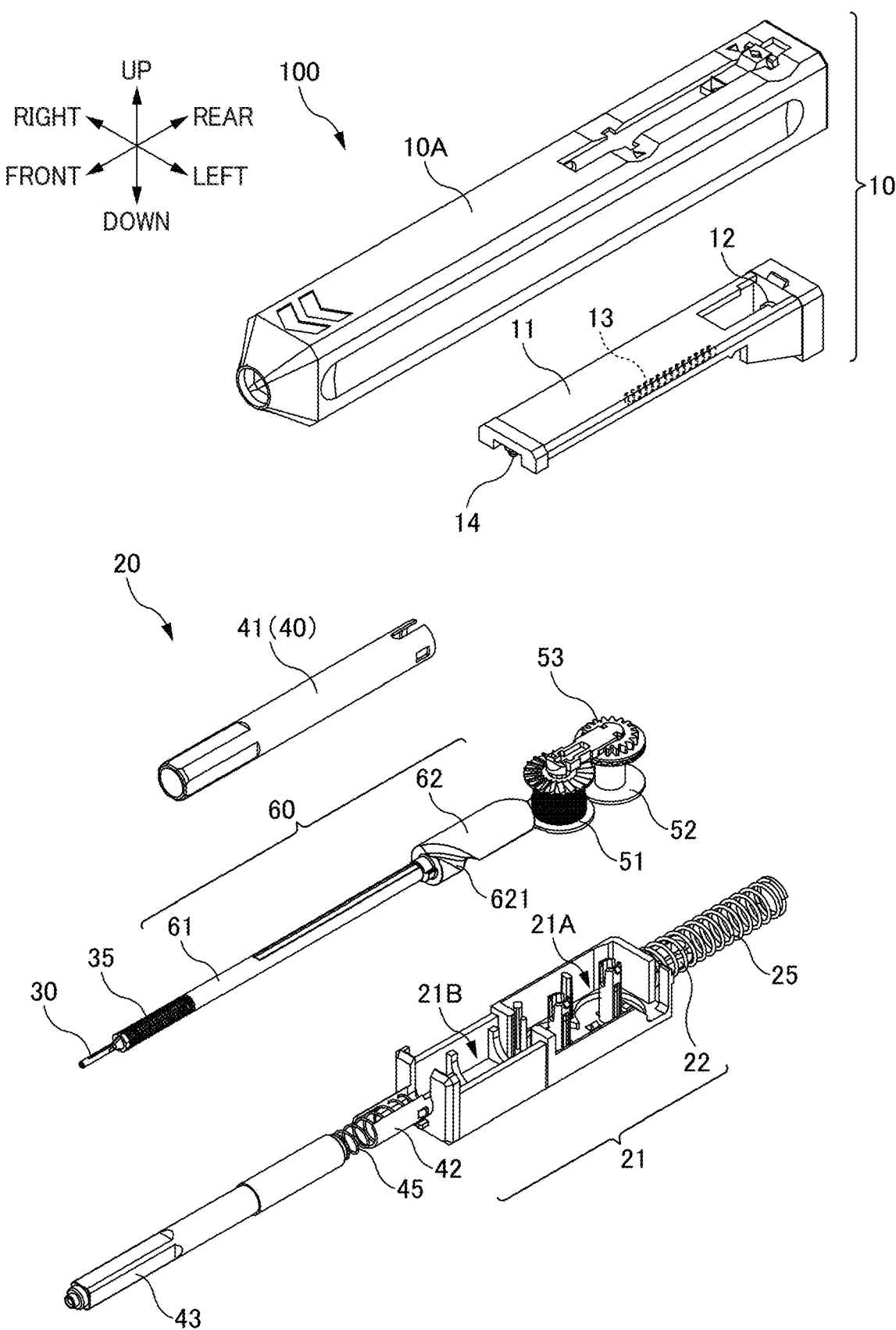
FIG. 3 is another exploded view of the cleaning tool 100.

FIG. 1A is a perspective view of a cleaning tool 100 of one or more embodiments. FIG. 1B is a perspective view of the cleaning tool 100 with a case 10A removed. FIG. 2 is an exploded view of the cleaning tool 100. FIG. 3 is another exploded view of the cleaning tool 100.

In the following description, directions are defined as shown in FIG. 2. A direction in which a tool main body 10 and an insertion part 20 move relative to each other is a "front-rear direction," with "front" being a side where the insertion part 20 extends from the tool main body 10 and "rear" being the opposite side to the front. Note that the front-rear direction may be called a "predetermined direction," a "movement direction," or an "operation direction." Also, a side of the cleaning tool 100 that comes into contact with a cleaning target (a front side) may be called a "tip end side," and the opposite side may be called a "base end side." The axial direction of a protrusion part 14 of a support body 11 is an "up-down direction," with "up" being the side where the protrusion part 14 is located relative to a rotary cylindrical part 62 and "down" being the opposite side. A direction perpendicular to the front-rear direction and the up-down direction is a "left-right direction," with "right" being the right side when the front is seen from the rear and "left" being the opposite side to the right. Note that the left-right direction may be called a "width direction."

The cleaning tool 100 is a tool for cleaning a cleaning target with a cleaning body 3. The cleaning target is, for example, an optical connector (a plug-side optical connector 5 or receptacle-side optical connector 5 to be described later; see FIGS. 8A and 8B), and is specifically a connecting end face of a ferrule of an optical connector. The cleaning body 3 is an elongated member that cleans a cleaning target. Although being a string-shaped member here, the cleaning body 3 may be a tape-shaped (band-shaped) member. However, when the cleaning body 3 is string-shaped because the loose cleaning body 3 is more likely to get entangled with other members (as will be described later) than when the cleaning body is tape-shaped, the cleaning tool 100 of one or more embodiments is particularly effective. The cleaning tool 100 has the tool main body 10 and the insertion part 20.

The tool main body 10 is a part forming the main body of the cleaning tool 100. A worker that operates the cleaning tool 100 holds the tool main body 10 when cleaning the optical connector 5 (a cleaning target). The tool main body 10 has the case 10A and the support body 11.

The case 10A is a member that forms the exterior of the tool main body 10. The case 10A is a part held by a worker during cleaning. The support body 11, reels (a supply reel 51 and a retrieve reel 52) around which the cleaning body 3 is wound, and the like are housed inside the case 10A. A part of the insertion part 20 on the base end side (such as a housing body 21), a coil spring 25, and the like are also housed inside the case 10A.

The support body 11 is a member that supports an end part of the coil spring 25 (an end part on the base end side). The support body 11 is housed in the case 10A while being fixed to the case 10A. The support body 11 has a support part 12, a rack 13, and the protrusion part 14. The support part 12 is a part that supports an end part of the coil spring 25. The support part 12 is located at the base end side of the support body 11. The rack 13 is a part forming a retrieve mechanism that retrieves the cleaning body 3. The protrusion part 14 is a part forming a rotation mechanism that rotates a head unit 30 by acting on a rotary shaft 60 to be described later and is a part forming a conversion part 73 that converts linear motion into rotational motion. The rack 13 and the protrusion part 14 will be described later.

The insertion part 20 is a part that is movable in the predetermined direction relative to the tool main body 10. A tip end side of the insertion part 20 extends from the tool main body 10 and toward to a cleaning target. The insertion part 20 has the head unit 30. The head unit 30 is located at the front side of the insertion part 20 and is held in such a manner as to be movable backward relative to the rotary shaft 60 (to be described later).

Figure 4:
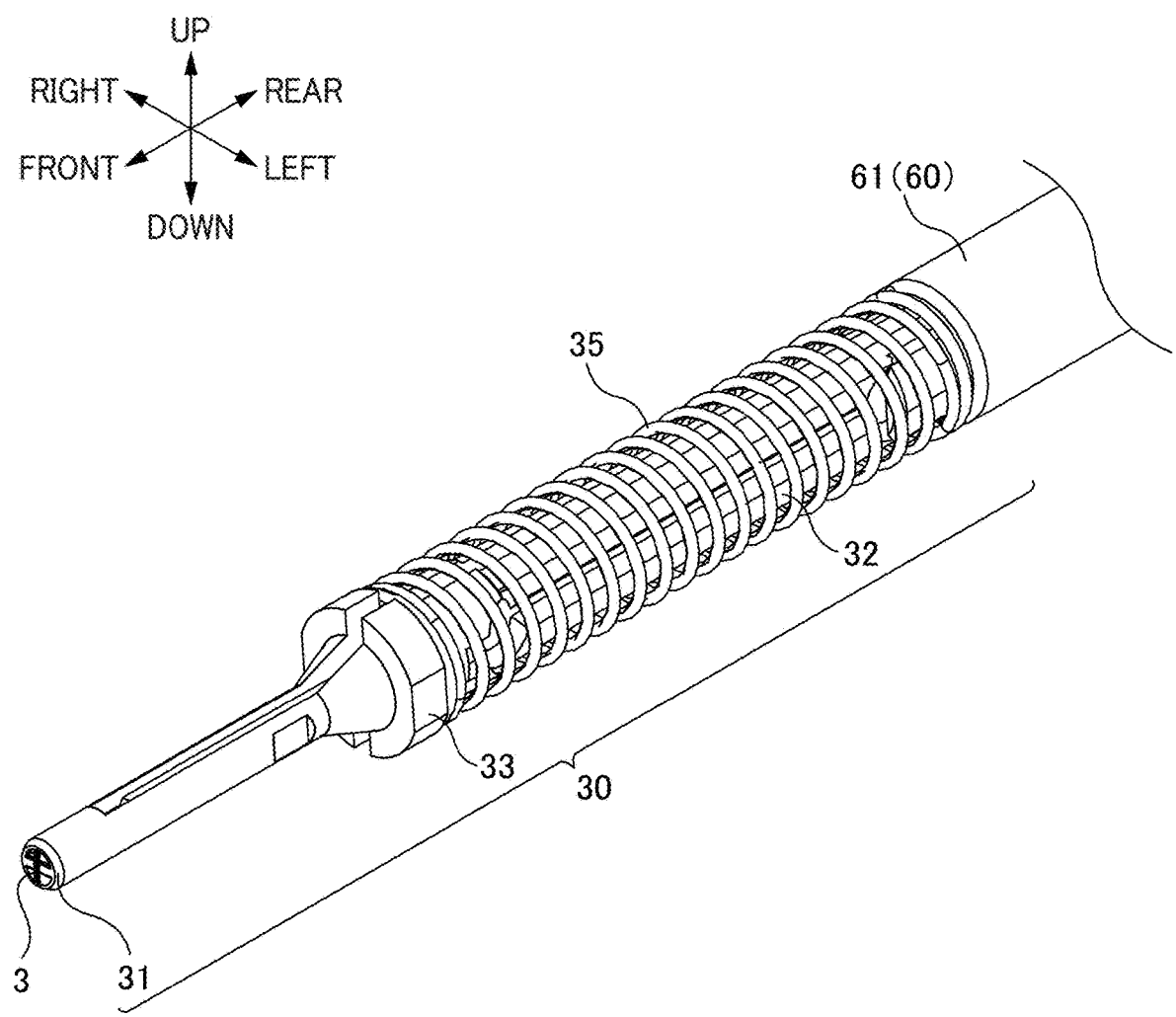
FIG. 4 is a perspective view of a head unit 30.

FIG. 4 is a perspective view of the head unit 30. FIG. 4 shows the head unit 30 without showing a tube body 40 (particularly a tip end tube part 43) covering the head unit 30.

The head unit 30 is a member for pressing the cleaning body 3 against a cleaning target. The head unit 30 is held in such a manner as to be movable backward relative to the rotary shaft 60 (to be described later) while being pressed frontward by a spring 35 for a head. Also, the head unit 30 oscillates about the movement direction (the front-rear direction) (rotates in the reciprocating directions about the movement direction). The head unit 30 has a head part 31, a base part 32, and a flange part 33.

The head part 31 is a part configured to press the cleaning body 3 against a cleaning target. The head part 31 is located at the tip end of the head unit 30. An end face of the head part 31 is a pressing face for pressing the cleaning body 3 against a cleaning target. The cleaning body 3 is wrapped around the end face (the pressing face) of the head part 31. In one or more embodiments, two holes are formed in the end face (the pressing face) of the head part 31, and the cleaning body 3 is wrapped between the two holes. The unused cleaning body 3 is supplied from one of the holes, and the used cleaning body 3 is retrieved into the other hole. However, instead of holes formed in the end face (the pressing face) of the head part 31, a groove may be cut to hold the cleaning body 3.

The base part 32 is a part that forms a base end side part of the head unit 30. The head unit 30 is held by the rotary shaft 60 at the base part 32. The base part 32 is held by the rotary shaft 60 in such a manner as to be slidable in the movement direction (the front-rear direction) relative to the rotary shaft 60. Also, the base part 32 is held by the rotary shaft 60 while being restricted from rotating about the movement direction (the front-rear direction) relative to the rotary shaft 60. Thus, the head unit 30 is slidable in the movement direction relative to the rotary shaft 60 and is rotatable about the movement direction along with the rotary shaft 60.

The flange part 33 is a part protruding outward from the outer circumferential surface of the base part 32. The flange part 33 is a part in contact with a tip end side end part (a front end) of the spring 35 for the head. The spring 35 for the head is a member configured to press the head unit 30 frontward, with the tip end side end part (the front end) being in contact with the flange part 33 and a base end side end part (a rear end) being in contact with the rotary shaft 60. The head unit 30 is pressed frontward when the flange part 33 receives a pressing force from the spring 35 for the head. Thereby, the cleaning body 3 wrapped around the head part 31 can be pressed against a cleaning target with a predetermined pressing force.

The base end side of the insertion part 20 includes the housing body 21. The housing body 21 is located inside the case 10A. It is configured such that, as the insertion part 20 moves relative to the tool main body 10, the housing body 21 can move relative to the support body 11. The housing body 21 has a first housing part 21A, a second housing part 21B, and a spring holding part 22.

The first housing part 21A is a part that houses the supply reel 51 and the retrieve reel 52. The first housing part 21A has reel support parts for supporting the supply reel 51 and the retrieve reel 52 in such a manner that they are rotatable. Here, the supply reel 51 and the retrieve reel 52 can rotate about the up-down direction. However, the direction of the rotation axes of the supply reel 51 and the retrieve reel 52 is not limited to this direction, and may be another direction (for example, the left-right direction) as long as the supply reel 51 can maintain a state of being able to supply the cleaning body 3 and the retrieve reel 52 can maintain a state of being able to retrieve the cleaning body 3.

The supply reel 51 is a reel for supplying the cleaning body 3. An unused cleaning body 3 is wound around the supply reel 51 in advance, and the cleaning body 3 is drawn from the supply reel 51 at the time of cleaning. In one or more embodiments, the supply reel 51 rotates about the up-down direction when the cleaning body 3 is drawn from the supply reel 51.

The retrieve reel 52 is a reel for retrieving the cleaning body 3. The retrieve reel 52 reels the used cleaning body 3. For this reason, the retrieve reel 52 is sometimes called a take-up reel. The retrieve reel 52 includes a gear 53 for rotating the retrieve reel 52. The gear 53 is a member that forms a retrieve mechanism that rotates the retrieve reel 52 by operating with the rack 13.

Figure 5A:
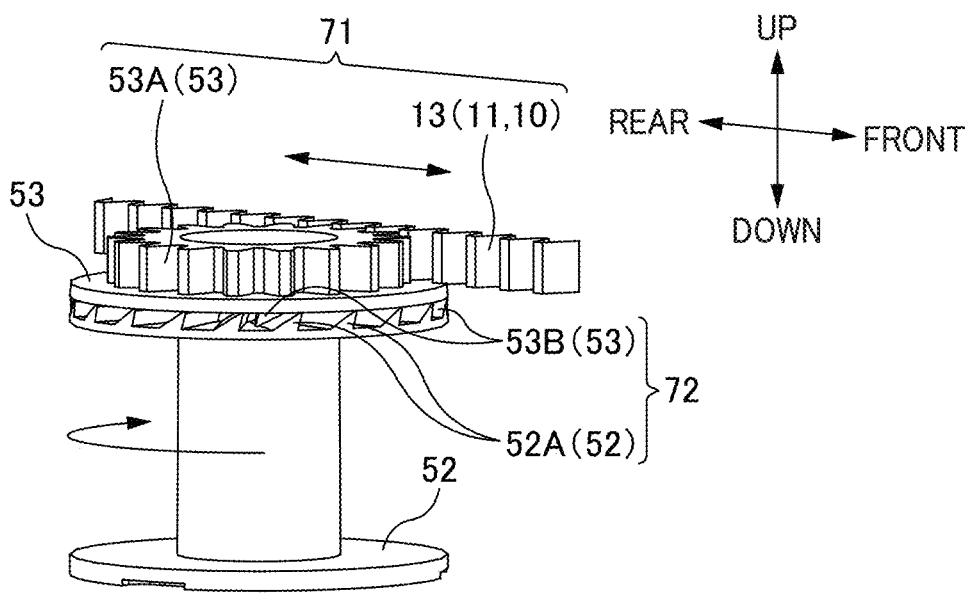
FIG. 5A is a diagram illustrating a retrieve mechanism.
Figure 5B:
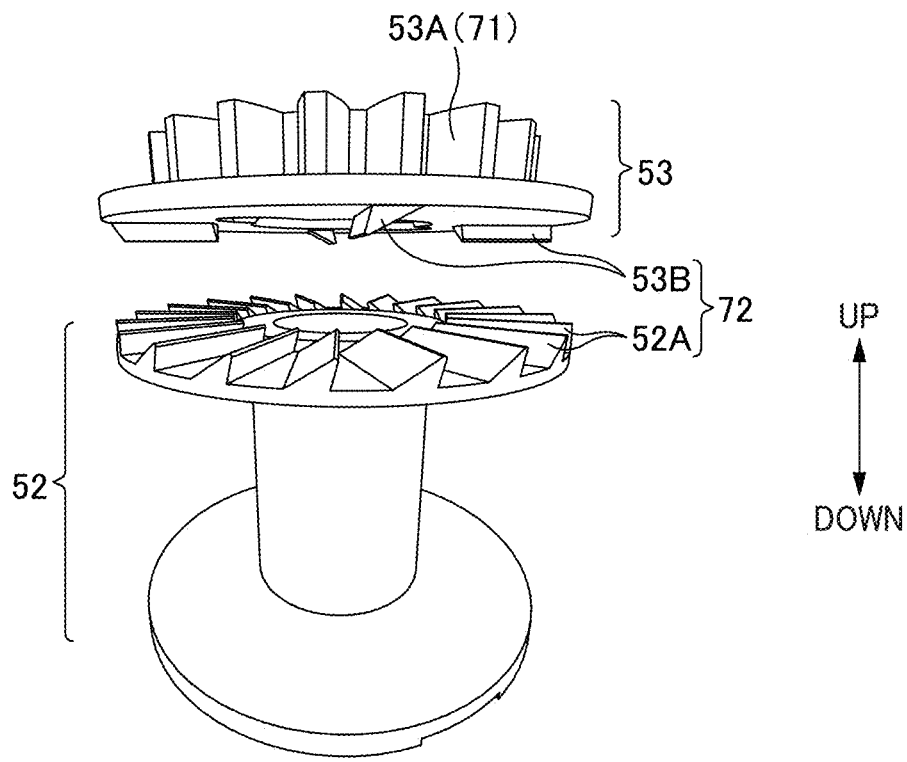
FIG. 5B is a diagram illustrating a ratchet mechanism 72.

FIG. 5A is a diagram illustrating the retrieve mechanism. FIG. 5B is a diagram illustrating a ratchet mechanism. FIG. 5B shows the retrieve reel 52 and the gear 53 separated from each other for the sake of illustration. The cleaning tool 100 of one or more embodiments includes the retrieve mechanism to retrieve the cleaning body 3. The retrieve mechanism is a mechanism that retrieves the cleaning body 3 using relative movement between the insertion part 20 and the tool main body 10.

The retrieve mechanism of one or more embodiments has the rack 13 at the support body 11, the gear 53, a reel-side ratchet gear 52A (see FIG. 5B) at the retrieve reel 52. In other words, the retrieve mechanism of one or more embodiments has a rack-and-pinion mechanism 71 and a ratchet mechanism 72. Note that the retrieve mechanism is not limited to a mechanism formed by the rack-and-pinion mechanism 71 and the ratchet mechanism 72 as long as the retrieve reel 52 can be rotated in the take-up direction by utilizing the relative movement between the insertion part 20 and the tool main body 10.

The rack-and-pinion mechanism 71 is a mechanism that converts linear motion into rotational motion, and has the rack 13 (a spur gear) and a pinion 53A. The rack 13 is a plate-shaped or bar-shaped gear. The rack 13 is located in the support body 11 of the tool main body 10. The rack 13 is located so that its teeth are arranged along the movement direction. The pinion 53A is a cylindrical pinion. The pinion 53A is included in the gear 53.

The gear 53 is a member that transmits power between the rack 13 and the retrieve reel 52. The gear 53 is located on the same axis as the retrieve reel 52, and is located in the first housing part 21A of the housing part 21 of the insertion part 20. The gear 53 has the pinion 53A and a gear-side ratchet gear 53B. The pinion 53A forming the rack-and-pinion mechanism 71 is located at an upper part of the gear 53, and the gear-side ratchet gear 53B forming the ratchet mechanism 72 is located at a lower part of the gear 53. The gear 53 makes rotary motion (oscillates) about the up-down direction in the reciprocating directions using the relative movement between the insertion part 20 and the tool main body 10 (linear motion).

The ratchet mechanism 72 is a mechanism that restricts the operation direction to one direction. Owing to the interposition of the ratchet mechanism 72, even when the gear 53 rotates in the reciprocating directions, the retrieve reel 52 rotates in one direction (the take-up direction). As shown in FIG. 5B, the ratchet mechanism 72 has the gear-side ratchet gear 53B and the reel-side ratchet gear 52A. The gear-side ratchet gear 53B is located at the lower part (the retrieve reel 52 side) of the gear 53. The reel-side ratchet gear 52A is located at the upper part (the gear 53 side) of the retrieve reel 52.

When the gear 53 rotates in a direction opposite from the take-up direction, the gear-side ratchet gear 53B rotates without meshing with the reel-side ratchet gear 52A in the ratchet mechanism 72, causing the retrieve reel 52 not to rotate. By contrast, when the gear 53 rotates in the take-up direction, the gear-side ratchet gear 53B and the reel-side ratchet gear 52A of the ratchet mechanism 72 mesh with each other, so that the rotation of the gear 53 is transmitted to the retrieve reel 52, causing the retrieve reel 52 to rotate in the take-up direction. In other words, out of the rotational motion of the gear 53 in one direction and the rotational motion of the gear 53 in the other direction, the ratchet mechanism 72 transmits only the rotational motion in one direction to the retrieve reel 52. In this way, the retrieve mechanism can retrieve the cleaning body 3 using the relative movement between the insertion part 20 and the tool main body 10 (linear motion).

The second housing part 21B is a part that houses the rotary cylindrical part 62 of the rotary shaft 60 in such a manner that the rotary cylindrical part 62 is rotatable (see FIGS. 2 and 3). The second housing part 21B is located closer to the head unit 30 (more frontward) than the first housing part 21A. A cam groove part 621 of the rotary cylindrical part 62 housed in the second housing part 21B is in engagement with the protrusion part 14 of the support body 11.

Figure 6:
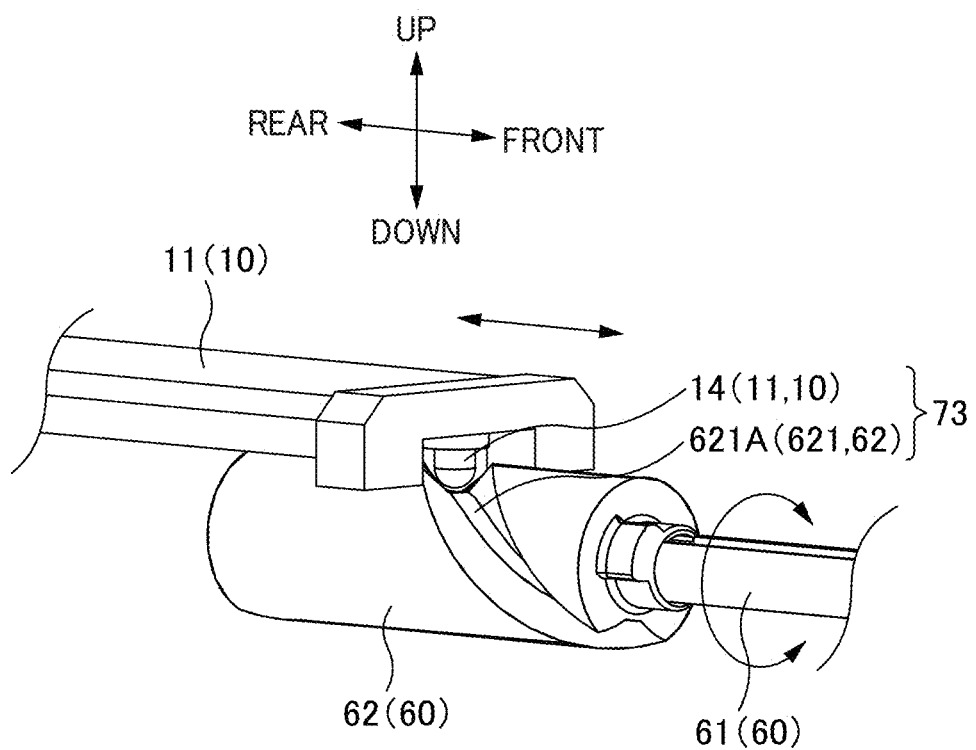
FIG. 6 is a diagram illustrating a rotation mechanism.

FIG. 6 is a diagram illustrating the rotation mechanism. The cleaning tool 100 of one or more embodiments includes the rotation mechanism to rotate the head unit 30. The rotation mechanism is a mechanism that rotates the head unit 30 in a rotation direction about the movement direction using the relative movement between the insertion part 20 and the tool main body 10. The rotation mechanism has the rotary shaft 60 and the conversion part 73.

The rotary shaft 60 is a member (a rotary member) that rotates the head unit 30 (see FIG. 3). The rotary shaft 60 holds the head unit 30 in such a manner that the head unit 30 can slide in the movement direction, and holds the head unit 30 while restricting the head unit 30 from rotating about the movement direction. The rotary shaft 60 is configured to be rotatable about the movement direction. When the rotary shaft 60 rotates, the head unit 30 rotates. An insertion hole (not shown) is formed in the rotary shaft 60, extending in the movement direction, and the cleaning body 3 is inserted through the insertion hole (not shown).

As shown in FIG. 3, the rotary shaft 60 has a shaft part 61 and the rotary cylindrical part 62.

The shaft part 61 is a part that transmits rotational force to the head unit 30. The shaft part 61 is a bar-shaped (tubular) part consisting of a part of the tip end side of the rotary shaft 60 (a part on the head unit 30 side), and holds the head unit 30 (or the base part 32 to be more specific) as shown in FIG. 4. The cleaning body 3 is inserted through an insertion hole (not shown) inside the shaft part 61. The cleaning body 3 is transported in the movement direction through the insertion hole in the shaft part 61. The shaft part 61 holds the head unit 30 in such a manner that the head unit 30 is slidable in the movement direction and is restricted from rotating about the movement direction. Thus, the head unit 30 is held in such a manner as to be movable backward relative to the rotary shaft 60 and can rotate along with the rotary shaft 60. Also, as shown in FIG. 4, the shaft part 61 holds the base end side end part (the rear end) of the spring 35 for the head. The spring 35 for the head is located between the shaft part 61 and the head unit 30 (or the flange part 33 to be more specific), and presses the head unit 30 frontward (toward a cleaning target) relative to the rotary shaft 60.

The rotary cylindrical part 62 is a cylindrical part forming part of the rotary shaft 60 and is located closer to the base end side (the support body 11 side) than the shaft part 61. The rotary cylindrical part 62 is, as shown in FIG. 2, housed in the second housing part 21B of the housing body 21. The cam groove part 621 is located at the outer circumferential surface of the rotary cylindrical part 62. The cam groove part 621 is a groove-shaped part (a groove part) forming the conversion part 73 to be described later.

As shown in FIG. 6, the conversion part 73 is a mechanism that converts linear motion into rotational motion. The conversion part 73 of one or more embodiments is formed by a cylindrical cam mechanism, and has the protrusion part 14 which is located at the support body 11 of the tool main body 10 and the cam groove part 621 which is located in the outer circumferential surface of the rotary cylindrical part 62 of the rotary shaft 60. However, the conversion part 73 is not limited to a cylindrical cam mechanism as long as the mechanism converts linear motion into rotational motion. The protrusion part 14 is located on the support body 11 of the tool main body 10. The cam groove part 621 is a groove-shaped part (a groove part) located in the outer circumferential surface of the rotary cylindrical part 62 of the rotary shaft 60. Note that details of the groove shape of this cam groove part 621 will be described later. Because the protrusion part 14 and the cam groove part 621 are in engagement with each other when the support body 11 makes linear motion relative to the rotary cylindrical part 62 (relative movement), the rotary cylindrical part 62 rotates about the movement direction by following the helical shape of the cam groove part 621 of the rotary cylindrical part 62. As a result, in one or more embodiments, when the tool main body 10 and the insertion part 20 move relative to each other (linear motion), the rotary shaft 60 is rotated by the conversion part 73, thereby causing the head unit 30 to rotate.

The rotation mechanism of one or more embodiments rotates the head unit 30 after the retrieve mechanism (see FIG. 5A) retrieves the cleaning body 3 using the relative movement between the insertion part 20 and the tool main body 10 (linear motion). The configuration of the rotation mechanism (or the cam groove part 621 in particular) for such an operation will be described later.

The spring holding part 22 is a part that holds an end part of the coil spring 25. The spring holding part 22 is located at an end part of the housing body 21. The coil spring 25 is a member configured to press the housing body 21 frontward (toward a cleaning target) relative to the support body 11. Although the insertion part 20 moves backward relative to the tool main body 10 during cleaning (the housing body 21 moves backward relative to the support body 11), after the cleaning, the insertion part 20 moves frontward relative to the tool main body 10 due to the force from the coil spring 25, so that the cleaning tool 100 can return to its initial state.

The tube body 40 is located at the tip end side of the insertion part 20 (see FIGS. 2 and 3). The tube body 40 is a tubular member extending frontward from the housing body 21. The tube body 40 has a base tube part 41, the tip end tube part 43, and a spring 45 for a tube part.

The base tube part 41 is a member forming a rear part (a base end side part) of the tube body 40 and is fixed to the housing body 21. The shaft part 61 of the rotary shaft 60 is inserted through the inside of the base tube part 41. The spring 45 for the tube part is located inside the base tube part 41. An abutment part 42 is located inside the base tube part 41. The abutment part 42 is a part that comes into abutment with an end part (the base end) of the tip end tube part 43.

The tip end tube part 43 is a member forming a tip end side part of the tube body 40. A rear part of the tip end tube part 43 (the end part on the tool main body 10 side) is located inside the base tube part 41. The tip end side part of the tip end tube part 43 (the end part on the cleaning target side) extends frontward of the base tube part 41, and houses the shaft part 61 of the rotary shaft 60, the spring 35 for the head, and the head unit 30. The tip end tube part 43 can slide in the movement direction relative to the base tube part 41. The tip end tube part 43 is held by the base tube part 41 in such a manner as to be movable backward relative to the base tube part 41 while being pressed frontward by the spring 45 for the tube part.

The spring 45 for the tube part is a member configured to press the tip end tube part 43 frontward. The spring 45 for the tube part is located between the housing body 21 and the tip end tube part 43. A base end side part (the rear part) of the spring 45 for the tube part is inserted through a tubular member forming the abutment part 42.

<Operation of the Cleaning Tool 100>

Figure 7A:
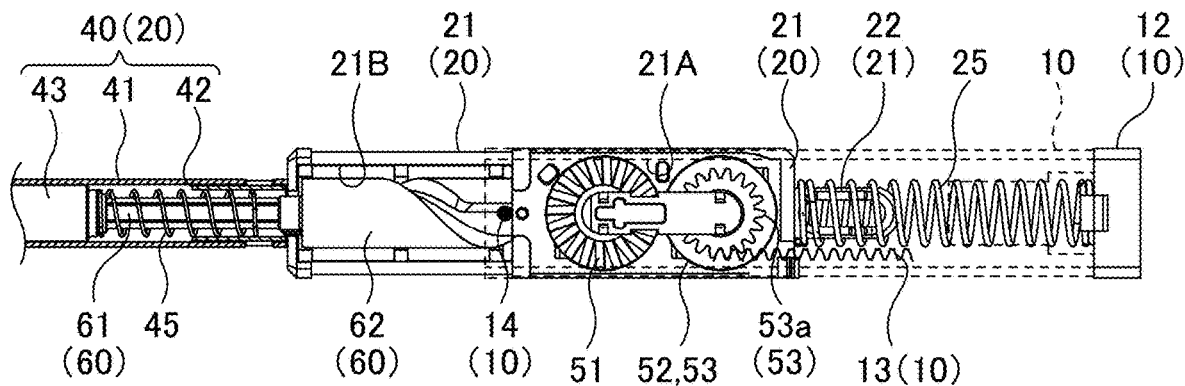
FIGS. 7A to 7C are diagrams illustrating how the tool main body 10 and an insertion part 20 move relative to each other.
Figure 7B:
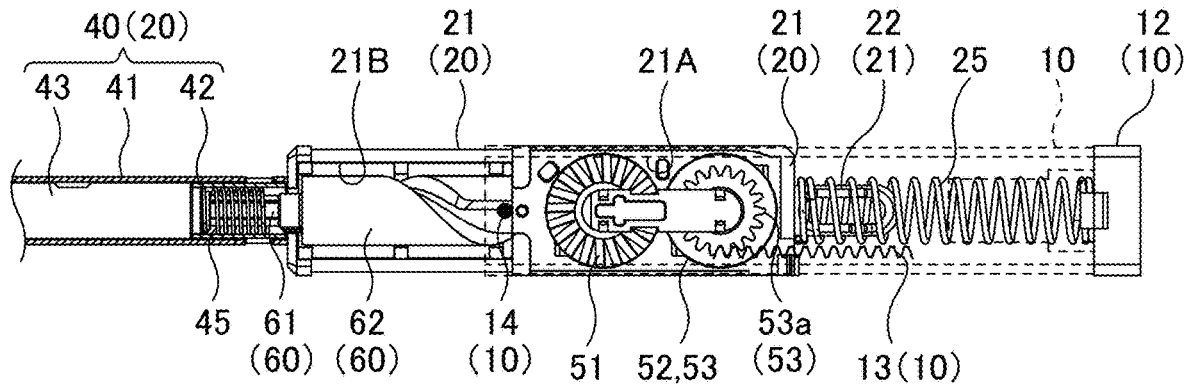
Figure 7C:
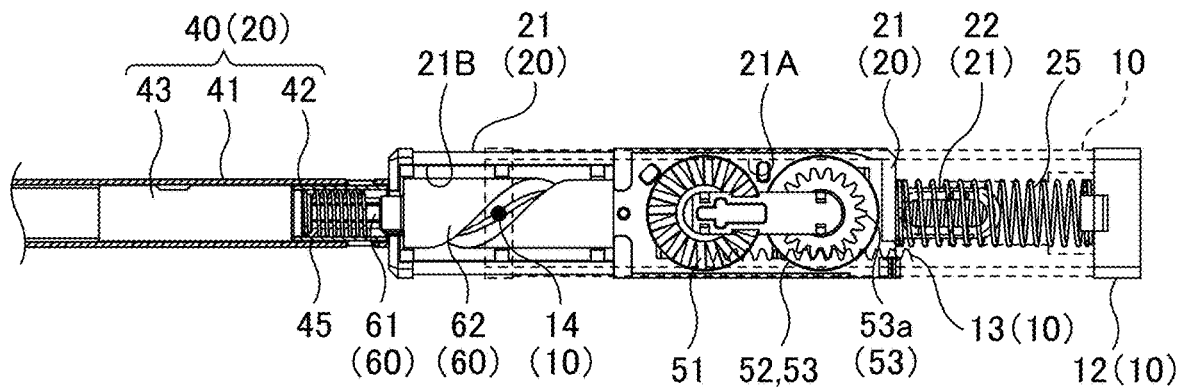

FIGS. 7A to 7C are diagrams illustrating how the tool main body 10 and the insertion part 20 move relative to each other. FIG. 7A is a diagram illustrating the positional relationship between the tool main body 10 and the insertion part 20 in an initial state. FIG. 7B is a diagram illustrating the positional relationship between the tool main body 10 and the insertion part 20 when the tip end tube part 43 has moved backward relative to the base tube part 41 to a point where the tip end tube part 43 abuts against the abutment part 42. FIG. 7C is a diagram illustrating the positional relationship between the tool main body 10 and the insertion part 20 in a state where the insertion part 20 has moved backward relative to the tool main body 10.

As shown in FIG. 7A, in the initial state, the housing body 21 of the insertion part 20 is being pressed by the coil spring 25 frontward relative to the tool main body 10. Also, in the initial state, the tip end tube part 43 is being pressed by the spring 45 for the tube part frontward relative to the housing body 21. A worker holds the tool main body 10 of the cleaning tool 100 in the initial state shown in FIG. 7A and presses the head unit 30 of the insertion part 20 of the cleaning tool 100 against the optical connector 5.

Figure 8A:
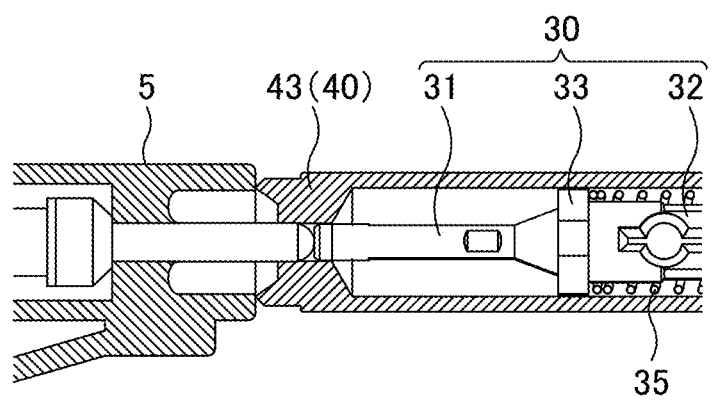
FIGS. 8A and 8B are diagrams illustrating the surroundings of a head part 31 during cleaning.
Figure 8B:
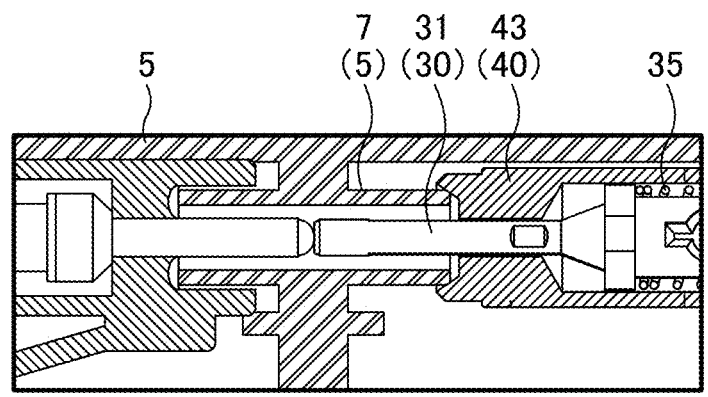

FIGS. 8A and 8B are diagrams illustrating the surroundings of the head part 31 during cleaning. FIG. 8A is a diagram illustrating how cleaning is done when the cleaning target is a plug-side optical connector 5. FIG. 8B is a diagram illustrating how cleaning is done when the cleaning target is a receptacle-side optical connector 5.

As shown in FIG. 8A, when the cleaning target is a plug-side optical connector 5, the ferrule of the optical connector 5 is inserted into the front side opening of the tip end tube part 43. The front side opening of the tip end tube part 43 has a function to guide the ferrule of the optical connector 5. The ferrule of the plug-side optical connector 5 is guided by the front side opening of the tip end tube part 43 and then comes into abutment with the head part 31 of the head unit 30 (the cleaning body 3 of the head part 31 is pressed against the ferrule). When the worker moves the tool main body 10 further toward the cleaning target with the head part 31 and the ferrule abutting against each other and thereby presses the cleaning body 3 against the optical connector 5, the spring 35 for the head compressively deforms, causing the head unit 30 to move backward relative to the rotary shaft 60 (push-back). As a result, as shown in FIG. 8A, the tip end tube part 43 and the housing of the optical connector 5 are brought into contact with each other with the head unit 30 having moved backward relative to the rotary shaft 60. In the following description, the head unit 30 moving backward relative to the rotary shaft 60 at the time of cleaning is also called "push-back."

When the cleaning target is a receptacle-side optical connector 5 as shown in FIG. 8B, the tip end tube part 43 comes into contact with the housing (or a split sleeve 7 to be more specific) of the optical connector 5, and the tip end tube part 43 moves backward relative to the base tube part 41. By the tip end tube part 43 moving backward, the head part 31 of the head unit 30 protrudes frontward of the tip end tube part 43, and the head part 31 is inserted into the housing (the split sleeve 7) of the optical connector 5. As a result, the head part 31 of the head unit 30 is guided by the housing (the split sleeve 7) of the receptacle-side optical connector 5 and brought into abutment with the ferrule (the cleaning body 3 of the head part 31 is pressed against the ferrule). When the worker moves the tool main body 10 further toward the cleaning target with the head part 31 and the ferrule abutting against each other and thereby presses the cleaning body 3 against the optical connector 5, the spring 35 for the head compressively deforms, causing the head unit 30 to move backward relative to the rotary shaft 60 (push-back). As a result, as shown in FIG. 8B, the tip end tube part 43 and the housing of the optical connector 5 are brought into contact with each other with the head unit 30 having moved backward relative to the rotary shaft 60.

As shown in FIG. 8A, when the cleaning target is a plug-side optical connector 5, the head unit 30 presses the cleaning body 3 against the cleaning target while being inside the insertion part 20 (the tip end tube part 43). Meanwhile, as shown in FIG. 8B, when the cleaning target is a receptacle-side optical connector 5, the head unit 30 presses the cleaning body 3 against the cleaning target while being outside the insertion part 20 (the tip end tube part 43). Thus, as shown in FIGS. 8A and 8B, the amount by which the head unit 30 moves backward relative to the rotary shaft 60 at the time of push-back is different depending on whether the optical connector 5 to be cleaned is a plug-side or a receptacle-side.

As described above, the tip end tube part 43 and the housing of the optical connector 5 come into contact with each other with the head unit 30 being pushed back (see FIGS. 8A and 8B). From the state where the tip end tube part 43 and the housing of the optical connector 5 are in contact with each other with the head unit 30 being pushed back, the worker brings the optical connector 5 and the tool main body 10 closer to each other in the movement direction to press the head unit 30 further against the optical connector 5 (either the optical connector 5 is pressed toward the tool main body 10 or the tool main body 10 is pressed toward the optical connector 5). As a result, the tip end tube part 43 moves backward relative to the base tube part 41, bringing an end part (the base end) of the tip end tube part 43 into abutment with the abutment part 42 as shown in FIG. 7B.

When the worker further brings the optical connector 5 and the tool main body 10 closer to each other from the state shown in FIG. 7B (the state where the tip end tube part 43 is in abutment with the abutment part 42), the housing body 21 moves backward relative to the tool main body 10 along with the tip end tube part 43 and the base tube part 41 by receiving a force from the optical connector 5 as shown in FIG. 7C. As a result, as shown in FIG. 7C, the insertion part 20 and the tool main body 10 move relative to each other.

As shown in FIG. 7C, when the housing body 21 moves backward relative to the support body 11, the rack-and-pinion mechanism 71 (see FIG. 5A) causes the gear 53 to rotate. The direction in which the gear 53 rotates when the housing body 21 moves backward relative to the support body 11 is the direction in which the gear-side ratchet gear 53B and the reel-side ratchet gear 52A of the ratchet mechanism 72 (see FIGS. 5A and 5B) mesh with each other, and thus, the rotation of the gear 53 is transmitted to the retrieve reel 52 to rotate the retrieve reel 52 in the take-up direction, causing the cleaning body 3 to be retrieved by the retrieve reel 52. In this way, the retrieve mechanism can retrieve the cleaning body 3 using the relative movement between the insertion part 20 and the tool main body 10.

Note that when the worker pulls the cleaning tool 100 out of the optical connector 5, the insertion part 20 moves forward relative to the tool main body 10 due to the force of the coil spring 25, and the cleaning tool 100 returns to the initial state. When the cleaning tool 100 returns to the initial state shown in FIG. 7A from the state shown in FIG. 7C, the housing body 21 moves forward relative to the support body 11, and the gear 53 rotates in the opposite direction. Because the direction in which the gear 53 rotates when the housing body 21 moves forward is the direction in which the ratchet mechanism 72 makes unmeshed rotation, the rotation of the gear 53 is not transmitted to the retrieve reel 52, so that the retrieve reel 52 is not rotated, and the cleaning tool 100 returns to the initial state shown in FIG. 7A.

As shown in FIG. 7C, when the housing body 21 moves backward relative to the support body 11, the rotation mechanism (see FIG. 6) causes the rotary shaft 60 to rotate about the movement direction, thereby causing the head unit 30 to rotate. Specifically, when the protrusion part 14 of the conversion part 73 and the cam groove part 621 move relative to each other with the protrusion part 14 and the cam groove part 621 being in engagement with each other, the rotary shaft 60 rotates about the front-rear direction, causing the head unit 30 to rotate.

FIGS. 9A and 9B are diagrams illustrating the cam groove part 621 of the rotary cylindrical part 62. FIG. 9A is a diagram illustrating the cam groove part 621 of one or more embodiments. FIG. 9B is a diagram illustrating a cam groove part 621 of a comparative example.

First, the cam groove part 621 of the comparative example shown in FIG. 9B is described. The cam groove part 621 of the comparative example does not include a retaining groove part 621B (see FIG. 9A), and a helical groove part 621A (a helical cam groove part 621) is formed to the rear edge of the rotary cylindrical part 62.

Figure 12A:
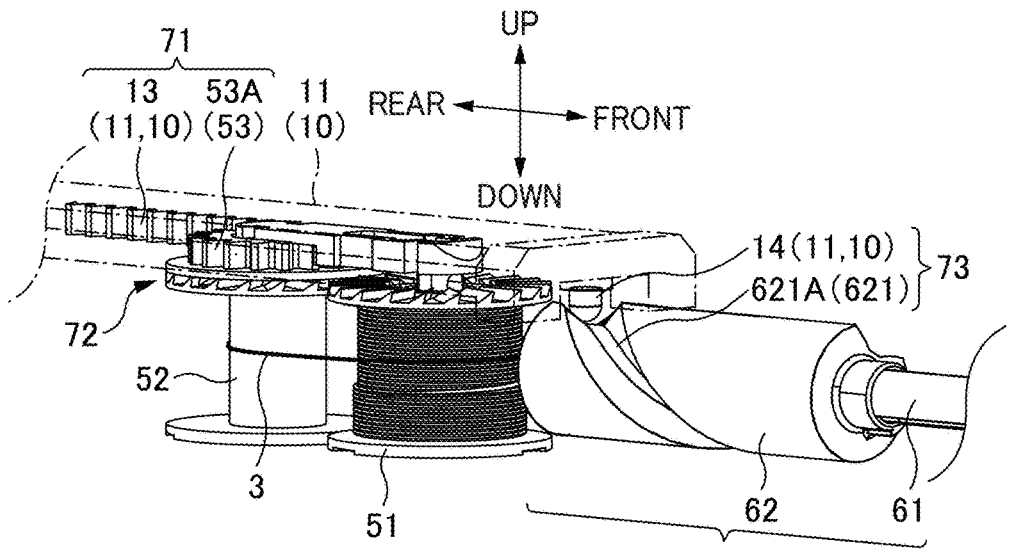
FIGS. 12A to 12C are diagrams illustrating an operation of a comparative example.
Figure 12B:
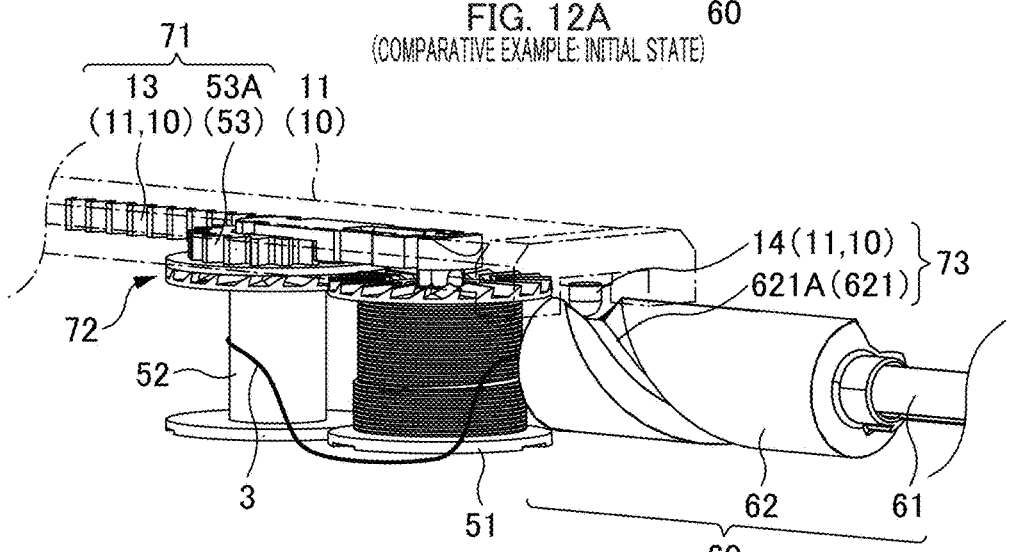
Figure 12C:
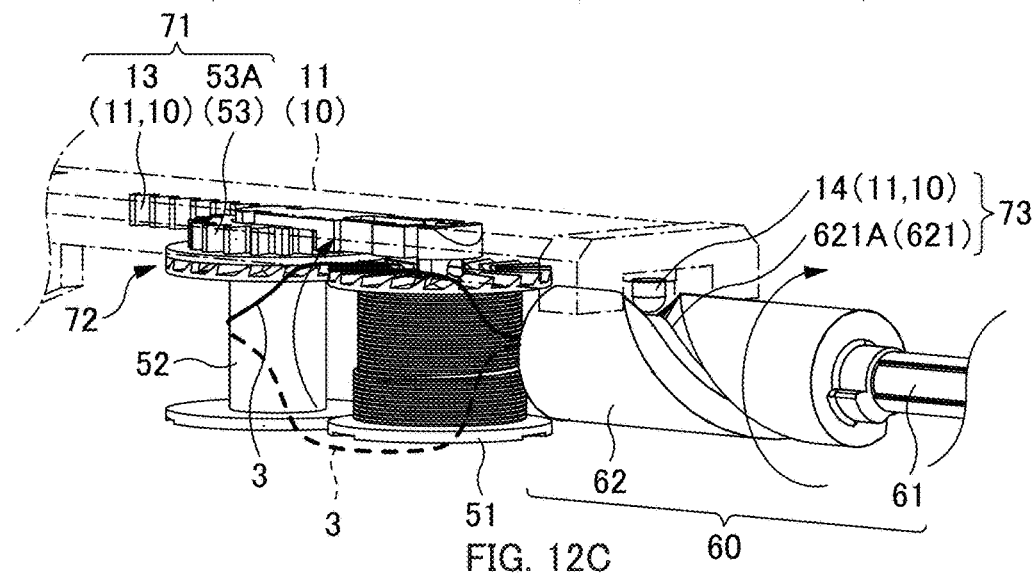

FIGS. 12A to 12C are diagrams illustrating an operation of the comparative example.

FIG. 12A shows the retrieve mechanism and the rotation mechanism in the initial state (see FIG. 7A). In the initial stage shown in FIG. 12A, the cleaning body 3 is wound up between the rotary shaft 60 and the retrieve reel 52 and is not loose.

As already described, the head unit 30 is pushed back before the housing body 21 moves backward relative to the tool main body 10 (before the insertion part 20 and the tool main body 10 move relative to each other) (see FIGS. 8A and 8B). FIG. 12B shows the retrieve mechanism and the rotation mechanism immediately before the insertion part 20 and the tool main body 10 move relative to each other. In this stage, when the head unit 30 is pushed back (when the head unit 30 moves backward relative to the rotary shaft 60), as shown in FIG. 12B, the cleaning body 3 is loosened between the rotary shaft 60 and the retrieve reel 52.

FIG. 12C is a diagram illustrating the comparative example immediately after the insertion part 20 and the tool main body 10 move relative to each other. In the comparative example, the helical groove part 621A is formed to the rear edge of the rotary cylindrical part 62, and thus, the rotary shaft 60 immediately starts rotating once the insertion part 20 and the tool main body 10 move relative to each other (once the rotary shaft 60 and the protrusion part 14 make linear motion). In other words, in the comparative example, the rotary shaft 60 starts rotating with the cleaning body 3 being loose. As a result, in the comparative example, as shown in FIG. 12C, the loose cleaning body 3 is swung around by the rotation of the rotary shaft 60 and might get entangled with other members (e.g., the supply reel 51). Note that when the cleaning body 3 is string-shaped, the loose cleaning body 3 is more likely to be swung around by the rotation of the rotary shaft 60 and to get entangled with other members than when the cleaning body is tape-shaped.

Thus, in one or more embodiments, the head unit 30 rotates after the retrieve mechanism (see FIG. 5A) retrieves the cleaning body 3 using the relative movement between the insertion part 20 and the tool main body 10 (linear motion). In other words, in one or more embodiments, the retrieve mechanism winds up the loose cleaning body 3 before the head unit 30 starts rotating. The following describes this point.

As shown in FIG. 9A, the cam groove part 621 of the rotary cylindrical part 62 of one or more embodiments has the helical groove part 621A and the retaining groove part 621B.

The helical groove part 621A is the helical cam groove part 621. The helical groove part 621A is the cam groove part 621 forming a zone in which the rotary cylindrical part 62 makes rotational motion (a rotational motion zone). In the zone where the helical groove part 621A engages with the protrusion part 14 (the rotational motion zone), as the protrusion part 14 and the rotary cylindrical part 62 move relative to each other in the movement direction (the front-rear direction), the protrusion part 14 comes into contact with and presses the side surface of the helical groove part 621A, thereby causing the rotary cylindrical part 62 to rotate about the moving direction (the front-rear direction).

The retaining groove part 621B is the cam groove part 621 forming a zone where the rotary cylindrical part 62 makes no rotational motion (a retaining zone). In the zone where the retaining groove part 621B engages with the protrusion part 14 (the retaining zone), even when the protrusion part 14 and the rotary cylindrical part 62 move relative to each other (linear motion), the side surface forming the retaining groove part 621B does not come into contact with the protrusion part 14. Thus, in the zone where the retaining groove part 621B engages with the protrusion part 14 (the retaining zone), the protrusion part 14 does not press the side surface of the retaining groove part 621B, and thus, even when the protrusion part 14 and the rotary cylindrical part 62 move relative to each other (linear motion), the rotary cylindrical part 62 is in a state of not rotating (the retaining state). In one or more embodiments, the retaining groove part 621B is formed as the cam groove part 621 wider than the helical groove part 621A. However, the retaining groove part 621B is not limited to this shape as long as the retaining groove part 621B is a cam groove that forms a zone where the rotary cylindrical part 62 makes no rotational motion (the retaining zone) (see, for example, FIG. 11A; to be described later). The retaining groove part 621B is located at the base end side of the outer circumference of the rotary cylindrical part 62 (a part in engagement with the protrusion part 14 in the initial state), and is located on the base end side of the helical groove part 621A (the protrusion part 14 side in the initial state). Because the retaining groove part 621B is located on the base end side of the helical groove part 621A (the protrusion part 14 side in the initial state), when the rotary cylindrical part 62 moves backward relative to the support body 11 (when the insertion part 20 moves backward relative to the tool main body 10), the protrusion part 14 first engages with the retaining groove part 621B and then engages with the helical groove part 621A.

Figure 10A:
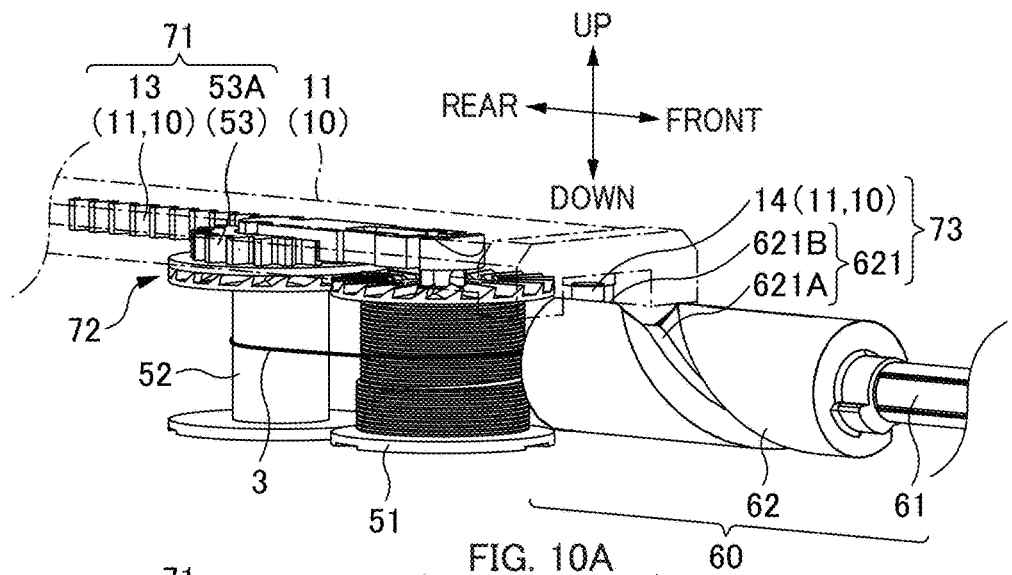
FIGS. 10A to 10C are diagrams illustrating an operation of one or more embodiments.
Figure 10B:
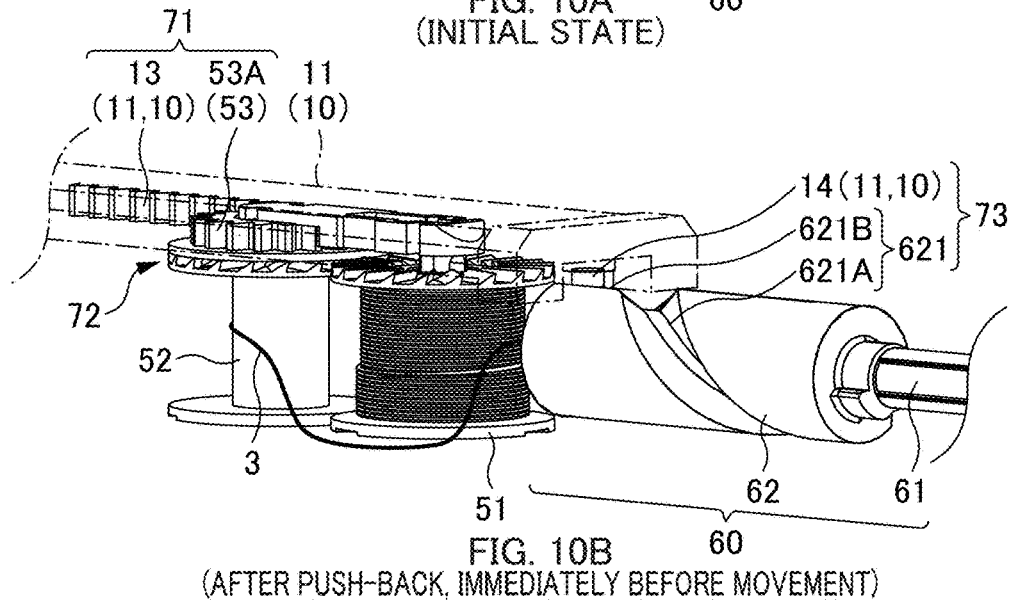
Figure 10C:
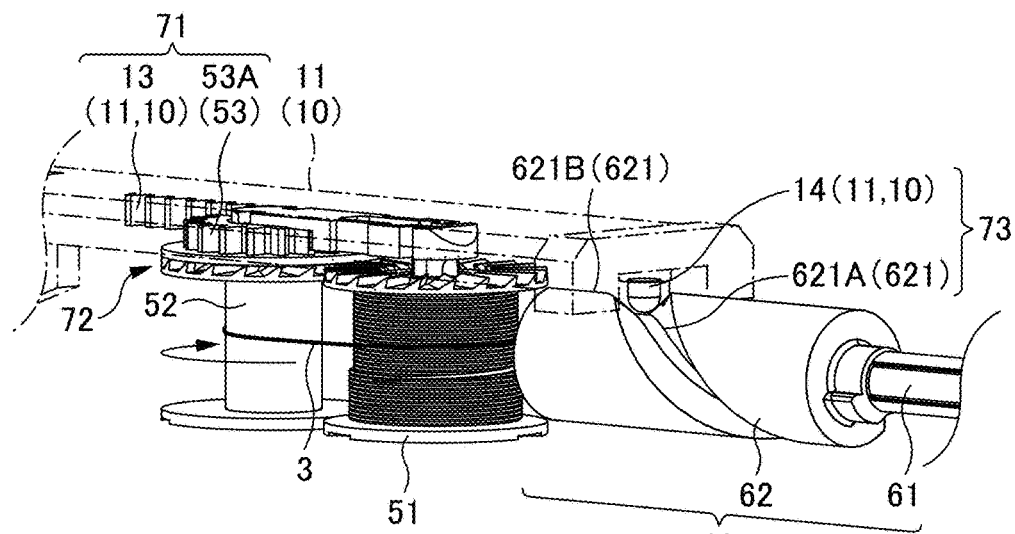

FIGS. 10A to 10C are diagrams illustrating an operation of one or more embodiments.

FIG. 10A shows the retrieve mechanism and the rotation mechanism in the initial state (see FIG. 7A). The cleaning body 3 is inserted through the insertion hole (not shown) in the rotary shaft 60 (the rotary cylindrical part 62), and the used cleaning body 3 is located between the retrieve reel 52 and the opening of the insertion hole in the rotary shaft 60. Because the retrieve mechanism has retrieved the cleaning body 3 in the last cleaning, in the initial stage shown in FIG. 10A, the cleaning body 3 is in a state of being wound up between the head unit 30 and the retrieve reel 52. As a result, as shown in FIG. 10A, in the initial stage, the cleaning body 3 is in a state of being wound up and is not loose between the rotary shaft 60 and the retrieve reel 52. Also, in this initial stage, the protrusion part 14 is in engagement with the retaining groove part 621B of the rotary cylindrical part 62.

As already described, the head unit 30 is pushed back before the housing body 21 moves backward relative to the tool main body 10 (before the insertion part 20 and the tool main body 10 move relative to each other) (see FIGS. 8A and 8B). FIG. 10B shows the retrieve mechanism and the rotation mechanism immediately after the head unit 30 is pushed back and immediately before the insertion part 20 and the tool main body 10 move relative to each other.

In the stage shown in FIG. 10B, when the head unit 30 is pushed back (when the head unit 30 moves backward relative to the rotary shaft 60), the cleaning body 3 is loosened between the head unit 30 and the retrieve reel 52. As a result, as shown in FIG. 10B, the cleaning body 3 is loosened between the retrieve reel 52 and the opening of the insertion hole (not shown) in the rotary cylindrical part 62. Note that in the stage shown in FIG. 10B, like in the initial stage shown in FIG. 10A, the protrusion part 14 is in engagement with the retaining groove part 621B of the rotary cylindrical part 62.

FIG. 10C is a diagram illustrating one or more embodiments immediately after the insertion part 20 and the tool main body 10 move relative to each other. In one or more embodiments, in the stage immediately after the insertion part 20 and the tool main body 10 move relative to each other, the retaining groove part 621B engages with the protrusion part 14. In the zone where the retaining groove part 621B engages with the protrusion part 14 (the retaining zone), the rotary cylindrical part 62 is in a state of not rotating (the retaining state) even when the protrusion part 14 and the rotary cylindrical part 62 move relative to each other.

Meanwhile, in the zone where the retaining groove part 621B engages with the protrusion part 14 (the retaining zone), the retrieve mechanism still retrieves the cleaning body 3 using the relative movement between the insertion part 20 and the tool main body 10 (linear motion). In other words, as shown in FIG. 10C, immediately after the relative movement between the insertion part 20 and the tool main body 10, the retrieve mechanism retrieves the cleaning body 3 with the rotary cylindrical part 62 being in the retaining state of not rotating. Thus, the loose cleaning body 3 is wound up by the retrieve mechanism before the rotary cylindrical part 62 rotates (before the head unit 30 rotates), reducing the loosening of the cleaning body 3.

From the state shown in FIG. 10C, the worker further brings the optical connector 5 and the tool main body 10 closer to each other in the movement direction, consequently moving the insertion part 20 backward relative to the tool main body 10, the protrusion part 14 engages with the helical groove part 621A, and the rotary cylindrical part 62 starts rotating. In one or more embodiments, in the stage where the rotary cylindrical part 62 rotates (in the stage where the head unit 30 rotates), the loosening of the cleaning body 3 has been reduced, and therefore, the cleaning body 3 is prevented from being swung around and getting entangled with other members (e.g., the supply reel 51) compared to the comparative example (see FIG. 12C).

As described above, the cleaning tool 100 of one or more embodiments includes the tool main body 10, the insertion part 20 having the head unit 30, the retrieve mechanism that retrieves the cleaning body 3 (see FIG. 5A), and the rotation mechanism that rotates the head unit 30 (see FIG. 6), and the rotation mechanism rotates the head unit 30 after the retrieve mechanism retrieves the cleaning body 3 using the relative movement between the tool main body 10 and the insertion part 20 in the predetermined direction (see FIG. 10C). Thus, compared to the comparative example (see FIG. 12C), the head unit 30 rotates after loosening of the cleaning body 3 is reduced, and thus, the cleaning body 3 can be prevented from being swung around and getting entangled.

Also, in the cleaning tool 100 described above, the rotation mechanism has the rotary shaft 60 and the conversion part 73 (see FIG. 6), and when the tool main body 10 and the insertion part 20 move relative to each other, the rotary shaft 60 is rotated by the conversion part 73, causing the head unit 30 to rotate. As a result, the linear motion of the tool main body 10 and the insertion part 20 is converted into rotational motion by the conversion part 73, and the rotational force can be transmitted to the head unit 30 by the rotary shaft 60, thereby rotating the head unit 30. Note that the conversion part 73 is not limited to what is shown in FIG. 6. Also, the rotation mechanism does not have to have the rotary shaft 60 or the conversion part 73 as long as the head unit 30 can be rotated using the relative movement between the tool main body 10 and the insertion part 20.

Also, the conversion part 73 described above has the protrusion part 14 and the cam groove part 621 (corresponding to a groove part) having the helical groove part 621A and the retaining groove part 621B. When the protrusion part 14 is in engagement with the retaining groove part 621B, the rotary shaft 60 is not rotated, and the cleaning body 3 is retrieved by the retrieve mechanism (see FIG. 10C). Then, in one or more embodiments, the protrusion part 14 first engages with the retaining groove part 621B and then engages with the helical groove part 621A, and thus, the rotary shaft 60 is rotated to rotate the head unit 30 after the retrieve mechanism retrieves the cleaning body 3. Because the head unit 30 is thus rotated after loosening of the cleaning body 3 is reduced, the cleaning body 3 can be prevented from being swung around and getting entangled. Note that, as will be described later, the retaining groove part 621B is not limited to the shape shown in FIG. 9A, and the conversion part 73 does not have to include the retaining groove part 621B.

Incidentally, the larger the amount by which the head unit 30 moves backward relative to the rotary shaft 60 when being pushed back, the more the cleaning body 3 loosens, and thus, it is particularly advantageous that, like in one or more embodiments, the head unit 30 rotates after the cleaning body 3 is retrieved. As already described, in one or more embodiments, when a cleaning target is the plug-side optical connector 5 (see FIG. 8A), the head unit 30 presses the cleaning body 3 against the cleaning target while being "inside" the tube body 40 (the tip end tube part 43) of the insertion part 20, whereas when a cleaning target is the receptacle-side optical connector 5 (see FIG. 8B), the head unit 30 presses the cleaning body 3 against the cleaning target while being "outside" the tube body 40. As a result, when the cleaning target is the plug-side optical connector 5 (see FIG. 8A), the head unit 30 moves backward more relative to the rotary shaft 60 when being pushed back, and the cleaning body 3 loosens more, compared to when a cleaning target is the receptacle-side optical connector 5 (see FIG. 8B). When the cleaning tool 100 is thus structured to be able to directly clean both of the plug-side optical connector 5 and the receptacle-side optical connector 5, the cleaning body 3 loosens more when cleaning one of the optical connectors, and thus, it is particularly advantageous that like in one or more embodiments, the head unit 30 is rotated after the cleaning body 3 is retrieved.

However, the cleaning tool 100 is not limited to having a structure capable of directly cleaning both of the plug-side optical connector 5 and the receptacle-side optical connector 5, and may have a structure capable of cleaning one of the optical connectors 5 or a structure capable of cleaning the plug-side and receptacle-side optical connectors 5 by attaching/detaching an attachment. Even in a cleaning tool having such structures, the cleaning body 3 loosens in the event of push-back, and thus, when the head unit 30 is rotated after the cleaning body 3 is retrieved, the cleaning body 3 can be prevented from being swung around and getting entangled.

===Modifications===
<First Modification>

In the embodiments described above, the retaining groove part 621B of the rotary cylindrical part 62 is formed as the cam groove part 621 wider than the helical groove part 621A. However, the retaining groove part 621B is not limited to the shape of the wide cam groove part 621.

FIG. 11A is a diagram illustrating the rotary cylindrical part 62 of a first modification. In the first modification as well, the rotary cylindrical part 62 has the helical groove part 621A and the retaining groove part 621B as the cam groove part 621. The retaining groove part 621B of the first modification is formed as a linear cam groove part 621 (a straight groove) having a groove width similar to that of the helical groove part 621A. Because the linear retaining groove part 621B is formed along the movement direction, in the first modification as well, the retaining groove part 621B is the cam groove part 621 forming the zone where the rotary cylindrical part 62 makes no rotational motion (a retaining zone). In the zone where the retaining groove part 621B engages with the protrusion part 14 (the retaining zone), even when the protrusion part 14 and the rotary cylindrical part 62 move relative to each other in the front-rear direction, the rotary cylindrical part 62 is in a state of not rotating (the retaining state). In the first modification as well, the rotary cylindrical part 62 (and the head unit 30) can be rotated after the retrieve mechanism (see FIG. 5A) retrieves the cleaning body 3 using the relative movement between the insertion part 20 and the tool main body 10 (linear motion). Thus, in the first modification as well, the cleaning body 3 can be prevented from being swung around and getting entangled with other members (e.g., the supply reel 51) compared to the comparative example (see FIG. 12C).

<Second Modification>

In the embodiments and the first modification described above, the rotary cylindrical part 62 is located with the retaining groove part 621B. However, the cam groove part 621 of the rotary cylindrical part 62 does not have to have the retaining groove part 621B.

FIG. 11B is a diagram illustrating a rotary cylindrical part 62 of a second modification. In the rotary cylindrical part 62 of the second modification, the cam groove part 621 does not have the retaining groove part 621B and has only with the helical groove part 621A. In the second modification, in the initial state, the protrusion part 14 of the support body 11 is located away from and rearward of the rotary cylindrical part 62. For this reason, in the second modification, in the stage immediately after the insertion part 20 and the tool main body 10 move relative to each other, the protrusion part 14 of the support body 11 does not engage with the helical groove part 621A of the rotary cylindrical part 62. A zone from immediately after the insertion part 20 and the tool main body 10 move relative to each other to when the protrusion part 14 engages with the helical groove part 621A of the rotary cylindrical part 62 is a zone where the rotary cylindrical part 62 makes no rotational motion (the retaining zone). In the second modification as well, the rotary cylindrical part 62 (and the head unit 30) can be rotated after the retrieve mechanism (see FIG. 5A) retrieves the cleaning body 3 using the relative movement between the insertion part 20 and the tool main body 10 (linear motion). Consequently, in the second modification as well, the cleaning body 3 can be prevented from being swung around and getting entangled with other members (e.g., the supply reel 51) compared to the comparative example (see FIG. 12C).

Meanwhile, in the case of the second modification, in a case where the positional relationship between the support body 11 and the rotary cylindrical part 62 is misaligned, the protrusion part 14 may fail to engage with the cam groove part 621 of the rotary cylindrical part 62. By contrast, in the embodiments and the first modification described above in which the rotary cylindrical part 62 is provided with the retaining groove part 621B, the protrusion part 14 of the support body 11 and the cam groove part 621 (the retaining groove part 621B) of the rotary cylindrical part 62 can be brought into engagement with each other from the initial state.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 3 cleaning body
5 optical connector
7 split sleeve
10 tool main body
10A case
11 support body
12 support part
13 rack
14 protrusion part
20 insertion part
21 housing body
21A first housing part
21B second housing part
22 spring holding part
25 coil spring
30 head unit
31 head part
32 base part
33 flange part
35 spring for head
40 tube body
41 base tube part
42 abutment part
43 tip end tube part
45 spring for tube part
51 supply reel
52 retrieve reel
52A reel-side ratchet gear
53 gear
53A pinion
53B gear-side ratchet gear
60 rotary shaft
61 shaft part
62 rotary cylindrical part
621 cam groove part
621A helical groove part
621B retaining groove part
71 rack-and-pinion mechanism
72 ratchet mechanism
73 conversion part
100 cleaning tool

The invention claimed is:

1. A cleaning tool comprising:
a tool main body;
an insertion part that:
    moves in a predetermined direction relative to the tool main body, and
    is configured to hold a head unit movable backward and configured to press a cleaning body against a cleaning target;
a retrieve mechanism that retrieves the cleaning body using a relative movement in the predetermined direction between the tool main body and the insertion part; and
a rotation mechanism that rotates the head unit after the retrieve mechanism retrieves the cleaning body using the relative movement in the predetermined direction between the tool main body and the insertion part, wherein
the rotation mechanism comprises:
    a rotary shaft that rotates along with the head unit; and
    a conversion part that converts linear motion in the predetermined direction into rotational motion,
the conversion part comprises:
    a protrusion part; and
    a helical groove part that is:
        disposed on an outer circumferential surface of the rotary shaft, and
        configured to engage with the protrusion part, and
    while the tool main body and the insertion part move relative to each other in the predetermined direction,
        the protrusion part does not engage with the helical groove part such that the retrieve mechanism retrieves the cleaning body without the rotary shaft being rotated, and
        the protrusion part engages with the helical groove part after the retrieve mechanism retrieves the cleaning body such that the rotary shaft is rotated by the conversion part and causes the head unit to rotate.

2. The cleaning tool according to claim 1, wherein
the conversion part further comprises
    a retaining groove part,
while the protrusion part engages with the retaining groove part, the cleaning body is retrieved by the retrieve mechanism without the rotary shaft being rotated, and
the protrusion part engages with the helical groove part after engaging with the retaining groove part such that, after the retrieve mechanism retrieves the cleaning body, the rotary shaft is rotated to rotate the head unit.

3. The cleaning tool according to claim 1, wherein
the rotary shaft has an insertion hole that enables the cleaning body to be inserted therethrough, and
while the head unit moves backward and presses the cleaning body against the cleaning target, the cleaning body is loose between an opening of the insertion hole and the retrieve mechanism.

4. The cleaning tool according to claim 1, wherein
in a case where the cleaning target is a receptacle-side optical connector, the head unit presses the cleaning body against the cleaning target outside the insertion part, and
in a case where the cleaning target is a plug-side optical connector, the head unit presses the cleaning body against the cleaning target inside the insertion part.

5. The cleaning tool according to claim 1, wherein the cleaning body is a string-shaped member.

\* \* \* \* \*